United States Patent
Hügel

(10) Patent No.: US 10,695,883 B2
(45) Date of Patent: Jun. 30, 2020

(54) DEVICE FOR PASSING LUBRICANT OUT OF A LUBRICANT COLLECTING CONTAINER

(71) Applicant: MAN Truck & Bus AG, München (DE)

(72) Inventor: Dietmar Hügel, Nürnberg (DE)

(73) Assignee: MAN TRUCK & BUS AG, München (DE)

(*) Notice: Subject to any disclaimer, the term of this patent is extended or adjusted under 35 U.S.C. 154(b) by 0 days.

(21) Appl. No.: 15/631,196

(22) Filed: Jun. 23, 2017

(65) Prior Publication Data

US 2017/0368656 A1    Dec. 28, 2017

(30) Foreign Application Priority Data

Jun. 23, 2016 (DE) .................. 10 2016 007 703

(51) Int. Cl.
| | |
|---|---|
| *F01M 1/10* | (2006.01) |
| *F16N 7/30* | (2006.01) |
| *F16N 7/00* | (2006.01) |
| *B23Q 11/12* | (2006.01) |
| *F16N 31/00* | (2006.01) |
| *F16N 39/06* | (2006.01) |

(Continued)

(52) U.S. Cl.
CPC .............. *B23Q 11/121* (2013.01); *F01M 1/10* (2013.01); *F16N 7/30* (2013.01); *F16N 31/00* (2013.01); *F16N 39/06* (2013.01); *B23Q 11/00* (2013.01); *B65G 2201/0244* (2013.01); *F01M 2011/007* (2013.01); *F16N 7/00* (2013.01); *F16N 2039/007* (2013.01); *F16N 2039/065* (2013.01)

(58) Field of Classification Search
CPC .... B23Q 11/121; F01M 1/10; F01M 11/0004; F01M 11/0408; F01M 2011/005; F16N 7/30; F16N 31/00; F16N 39/06; F16N 31/002; F16N 31/006; F16N 31/004
USPC .......................................................... 184/106
See application file for complete search history.

(56) References Cited

U.S. PATENT DOCUMENTS 1,754,904 A * 4/1930 Ray .......................... F16N 31/00
                                                                  384/286
1,892,185 A * 12/1932 Clements ........... F01M 11/0004
                                                                  210/167.02

(Continued)

FOREIGN PATENT DOCUMENTS

| DE | 1293723 B | 4/1969 |
|---|---|---|
| DE | 3022443 C2 | 4/1983 |

(Continued)

OTHER PUBLICATIONS

German Search Report issued in corresponding application No. 102016007703.4 dated May 4, 2017.

(Continued)

*Primary Examiner* — Emmanuel M Marcelo
*Assistant Examiner* — Mark K Buse
(74) *Attorney, Agent, or Firm* — Weber Rosselli & Cannon LLP

(57) ABSTRACT

A device for passing lubricant out of a lubricant collecting container to a lubricant pump, in particular for an oil circuit of an internal combustion engine. The device including a lubricant intake pipe and a sedimentation container, which is connected fluidically to the lubricant intake pipe.

15 Claims, 2 Drawing Sheets

(51) Int. Cl.
*B23Q 11/00* (2006.01)
*F01M 11/00* (2006.01)
*F16N 39/00* (2006.01)

(56) References Cited

U.S. PATENT DOCUMENTS

| | | | | | |
|---|---|---|---|---|---|
| 2,767,736 | A | * | 10/1956 | Lackinger | F15B 1/26 137/574 |
| 3,165,468 | A | * | 1/1965 | Strader | B01D 21/02 210/172.2 |
| 3,483,984 | A | * | 12/1969 | Wolkenhauer | B01D 21/0012 210/167.04 |
| 4,156,644 | A | * | 5/1979 | Richard | B01D 21/0045 210/802 |
| 4,296,716 | A | * | 10/1981 | Hofbauer | F01M 5/00 123/195 C |
| 5,667,671 | A | * | 9/1997 | Munsch | A01K 63/045 210/151 |
| 6,143,169 | A | * | 11/2000 | Lee | B01D 29/07 210/167.02 |
| 6,237,720 | B1 | * | 5/2001 | Sutton | F01M 11/0004 123/195 C |
| 6,616,836 | B1 | * | 9/2003 | Covington | B01D 29/016 210/167.02 |
| 2010/0230212 | A1 | * | 9/2010 | Jensen | B01D 35/027 184/6.24 |
| 2011/0083650 | A1 | * | 4/2011 | Mordukhovich | F01M 1/10 123/573 |
| 2011/0083651 | A1 | * | 4/2011 | Mordukhovich | F01M 1/10 123/573 |
| 2012/0186554 | A1 | * | 7/2012 | Goerend | F01M 11/0004 123/196 R |
| 2014/0311240 | A1 | | 10/2014 | Fitch et al. | |
| 2016/0333752 | A1 | * | 11/2016 | Aldridge | F01M 11/064 |

FOREIGN PATENT DOCUMENTS

| | | |
|---|---|---|
| DE | 102005005138 A1 | 8/2006 |
| JP | S49-147431 U | 12/1974 |
| JP | S55128611 A | 10/1980 |
| JP | 3006246 B2 | 2/2000 |
| JP | 2004293376 A | 10/2004 |
| WO | 2015/066111 A1 | 5/2015 |

OTHER PUBLICATIONS

European Search Report issued in corresponding EP application No. 17176406 dated Dec. 18, 2017.

* cited by examiner

DEVICE FOR PASSING LUBRICANT OUT OF A LUBRICANT COLLECTING CONTAINER

BACKGROUND

1. Technical Field

The present disclosure relates to a device for delivering lubricant out of a lubricant collecting container of a machine to a lubricant pump, wherein the device comprises a lubricant intake pipe. The machine can be an internal combustion engine or some other kind of machine, e.g. a hydraulic system. The lubricant pump can be a lubricant pump for an oil circuit of an internal combustion engine.

2. Description of Related Art

Oil intake pipes for delivering lubricant out of an oil sump of an oil pan to an oil pump, in particular for an oil circuit of an internal combustion engine, are known from the prior art.

The lubricant is usually also referred to as oil, even if nowadays this is often no longer oil. Accordingly, the lubricant intake pipes required for this are referred to as oil intake pipes, and the lubricant pumps are usually also referred to as oil pumps or oil pressure pumps. The terms "oil" and "lubricant" should therefore be regarded as synonymous in the context of the present disclosure.

Lubricant intake pipes or oil intake pipes of this kind are known from German Laid-Open Applications DE 30 22 443 C2 and DE 10 2005 005 138 A1, for example. Oil intake pipes of this kind, which are known per se, carry unfiltered lubricant to the oil pump. This can have the effect that the oil pump comes into contact with foreign particles and is thereby damaged.

SUMMARY

It is thus an object of the present disclosure to provide an improved device for delivering lubricant from a lubricant collecting container of an internal combustion engine to a lubricant pump, by means of which device disadvantages of conventional devices can be avoided. In particular, it is the object of the present disclosure to provide a device in which lubricant can be delivered from a lubricant collecting container to a lubricant pump via a lubricant intake pipe, while the contamination of the oil pump by foreign particles is to be prevented or at least reduced.

These objects are achieved by a device having the features of the independent claim. Advantageous aspects and uses of the present disclosure form the subject matter of the dependent claims and are explained in greater detail in the following description with reference in some cases to the figures.

According to general aspects of the present disclosure, said objects are achieved in that the lubricant, which is drawn in from a lubricant collecting container by a lubricant pump via a lubricant intake pipe, is passed through a sedimentation container before reaching the lubricant pump. The sedimentation container is a container through which the lubricant flows on the way from the lubricant collecting container to the lubricant pump and which brings about an enlargement of the cross section over a partial segment of the delivery path of the lubricant from the lubricant collecting container to the lubricant pump. The sedimentation container, in particular the enlargement in cross section, reduces the speed of flow of the lubricant and thereby enables particles to be deposited in the sedimentation container. It is thereby possible to ensure, in a manner which is simple in terms of design, that dirt particles which are present in the lubricant drawn in from the lubricant container are at least partially separated out and retained on the way to the lubricant pump, before reaching the lubricant pump.

According to the present disclosure, a device for passing or delivering or conveying lubricant from a lubricant collecting container to a lubricant pump is therefore provided, wherein the device has a lubricant intake pipe and a sedimentation container, which is connected fluidically to the lubricant intake pipe. In particular, the device can be a device of this kind for an oil circuit of an internal combustion engine. According to this variant, the lubricant collecting container is a lubricant collecting container of an oil circuit of the internal combustion engine. However, the lubricant collecting container can also be a lubricant collecting container of some other machine or of a hydraulic system.

The lubricant collecting container can be an oil reservoir, in particular an oil pan of an internal combustion engine. The lubricant intake pipe is also referred to below as an oil intake pipe.

The sedimentation container is preferably arranged or installed between a lubricant inlet opening and a lubricant outlet opening of the lubricant intake pipe. In particular, the sedimentation container is arranged in such a way between the lubricant collecting container and the lubricant pump that lubricant drawn out of the lubricant container is introduced into the sedimentation container before it reaches the lubricant pump, wherein the sedimentation container allows continuous particle sedimentation by virtue of its size and/or shape, with the result that a suspension accumulates at the bottom of the sedimentation container, this suspension being enriched with relatively coarse particles in comparison with the overall suspension.

It is emphasized that the geometrical and/or design aspect of the sedimentation container is not restricted to a specific aspect; on the contrary, it can be matched to the design circumstances or the available installation space. It has already been mentioned above that the sedimentation container is embodied in such a way that it produces an enlargement in cross section for the lubricant drawn in comparison with the other segments of the lubricant intake pipe, by virtue of which enlargement the speed of flow of the lubricant drawn in is reduced, thereby allowing contaminating particles to sediment. The foreign particles contained in the lubricant can therefore settle in thin layers over a large area in the bottom region of the sedimentation container.

In this context, one aspect envisages that the lubricant intake pipe has a first pipe segment, by means of which lubricant can be fed from the lubricant collecting container to an inlet opening of the sedimentation container. According to this aspect, the lubricant intake pipe furthermore has a second pipe segment, by means of which lubricant emerging from an outlet opening of the sedimentation container can be delivered in the direction of the lubricant pump.

According to an alternative aspect, an end region of the lubricant intake pipe can be connected fluidically to an inlet opening of the sedimentation container, and an outlet opening of the sedimentation container can be directly connected fluidically to the lubricant pump via a connection piece.

To increase the sedimentation effect of the sedimentation container, it is particularly advantageous if the sedimentation container has a turbulator. It is furthermore particularly advantageous if the turbulator is arranged in the region of an inlet opening of the sedimentation container.

The term "turbulators" is applied to elements which represent an obstacle to the flow of the lubricant stream drawn in and lead to eddying, i.e. to the formation of turbulence, when the lubricant flows over them. Thus, a turbulator is a component and/or surface structuring which acts/act as a turbulence generator or generators when lubricant flows over them/it. Owing to the turbulence produced, the sedimentation rate of foreign particles in the sedimentation container is increased.

To improve ease of maintenance, the sedimentation container can have a drain connection arranged in the bottom. This makes it a simple matter to drain off the suspension that has accumulated at the bottom over time without having to disassemble or exchange the sediment container.

The sediment container can furthermore have a filling connection and/or an inspection connection. These connections are preferably arranged higher than the drain connection, i.e. not in the bottom region. Via the filling connection, the sedimentation container can be prefilled with lubricant. The filling connection can also be used for flushing. The filling connection is preferably situated halfway up the sedimentation container or in an upper half of the sedimentation container. The inspection connection is preferably arranged in a lower half of the sedimentation container. Via the inspection connection, it is possible, for example, to check the quantity of sedimented material in the bottom region of the sedimentation container. The drain connection, the filling connection and/or the inspection connection can each be embodied as closable openings, to which it is also possible to connect a line.

Within the context of the present disclosure, there is the possibility for the sedimentation container to be embodied as a separate component, which is connected fluidically to the lubricant intake pipe. For example, the sedimentation container can be arranged between the two pipe segments of the lubricant intake pipe, as described above, thus ensuring that the lubricant emerging from the first pipe segment flows into the sedimentation container and, after flowing through the sedimentation container, enters the second pipe segment.

However, it is also possible for the sedimentation container to form a central segment of the lubricant intake pipe which has an enlarged cross section. In this case, the sedimentation container is embodied as an integral component of the lubricant intake pipe.

The lubricant intake pipe can furthermore have an intake cage at the inlet end thereof. The inlet end is the end which can be inserted into a lubricant sump of a lubricant container.

According to another aspect, the device furthermore comprises the lubricant collecting container. For reasons connected with installation space, it is furthermore particularly advantageous if the sedimentation container is integrated into the lubricant collecting container and/or is encased by the latter. However, it is also possible for the sedimentation container to be arranged outside the lubricant collecting container.

According to yet another aspect of the present disclosure, the device for delivering lubricants can furthermore have the lubricant pump, wherein the lubricant pump is designed to draw in lubricant from the lubricant collecting container via the lubricant intake pipe and the sedimentation container and feed it to consuming units. In this arrangement, the lubricant collecting container can be the oil pan of an internal combustion engine, and the lubricant pump can be an oil pump.

According to another aspect of the present disclosure, a motor vehicle, in particular a commercial vehicle, is provided, having a device for delivering lubricant, as described in this document.

BRIEF DESCRIPTION OF THE DRAWINGS

The above-described aspects and features of the present disclosure can be combined with one another in any desired manner. Further details and advantages of the present disclosure are described below with reference to the attached drawings, in which.

DETAILED DESCRIPTION

Figure 1:
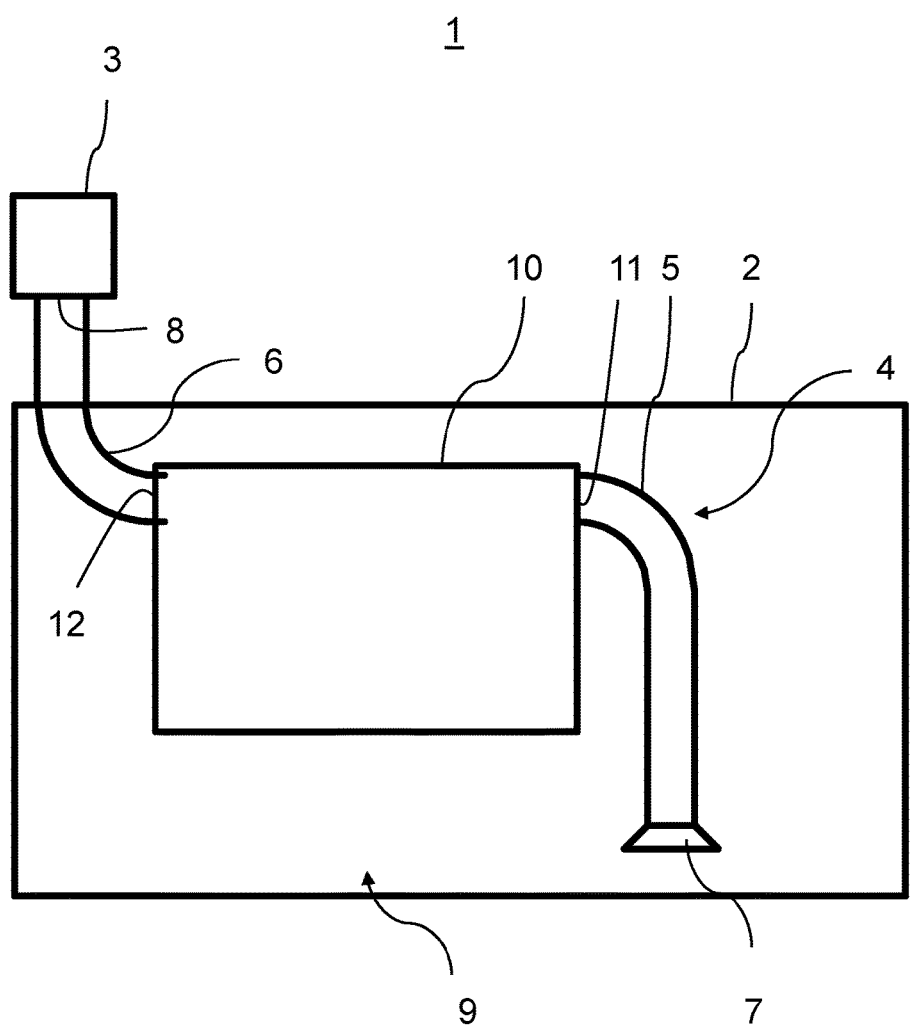
FIG. 1 shows a highly schematized illustration of a device for delivering lubricant in accordance with a first aspect of the present disclosure.

FIG. 1 shows an oil pan 2 of an internal combustion engine of a motor vehicle in a highly schematized diagrammatic illustration, said oil pan being secured on the crankcase (not shown) underneath the engine.

The oil pan 2 is designed with an oil collecting region 9, which collects oil or engine oil flowing out of an engine block of the internal combustion engine, said engine block being arranged above the oil pan 2 in the position of installation of the internal combustion engine in a motor vehicle, and serves as a receptacle (oil sump) for the engine oil. The oil collected by means of the oil collecting region 9 is drawn in by an oil pump 3 through a lubricant intake pipe 4. In this case, the lubricant intake pipe 4 has, at its inlet end, an intake cage 7, which dips into the oil sump. The lubricant emerging from the outlet 8 of the oil intake pipe 4 is then fed to the lubricant pump 3 by means of the suction power thereof.

One special feature of the device 1 according to the present disclosure for delivering lubricant from the oil pan 2 to the lubricant pump 3 is that the oil intake pipe 4 is connected fluidically to a sedimentation container 10. According to the variant shown in FIG. 1, the oil intake pipe 4 has, for this purpose, a first pipe segment 5, by means of which lubricant can be fed from the oil pan to an inlet opening 11 of the sedimentation container 10. The oil intake pipe 4 furthermore has a second pipe segment 6, by means of which the lubricant emerging from an outlet opening 12 of the sedimentation container 10 can be delivered in the direction of the oil pump 3 or is delivered during operation. Here, the sedimentation container 10 is embodied as a separate component, which is connected fluidically to the two pipe segments 5, 6 of the oil intake pipe 4, with the result that the oil drawn in from the oil pan 2 must flow through the sedimentation container 10 on the way to the oil pump 3.

The sedimentation container 10 has the effect that foreign particles are deposited therein. The sedimentation container 10, e.g. in the form of a sedimentation case, brings about an enlargement in cross section for the oil stream, the speed of flow of which is thereby reduced and, as a result, allows settling of particles, which collect in the bottom region of the sedimentation container 10. In this way, dirt particles are separated out and retained in the sedimentation container on the way to the oil pump 3.

The inlet opening 11 and the outlet opening 12 of the sedimentation container are situated in an upper region of the sedimentation container, with the result that the first pipe segment 5 and the second pipe segment 6 each open into an upper region of the sedimentation container, thereby allowing the sedimented particles separated out to collect in the lower region of the sedimentation container 10.

As can furthermore be seen in FIG. 1, the sedimentation container is arranged within the oil pan 2 and is encased by the latter.

According to another aspect of the present disclosure, the sedimentation case can be arranged outside the oil pan.

Figure 2:
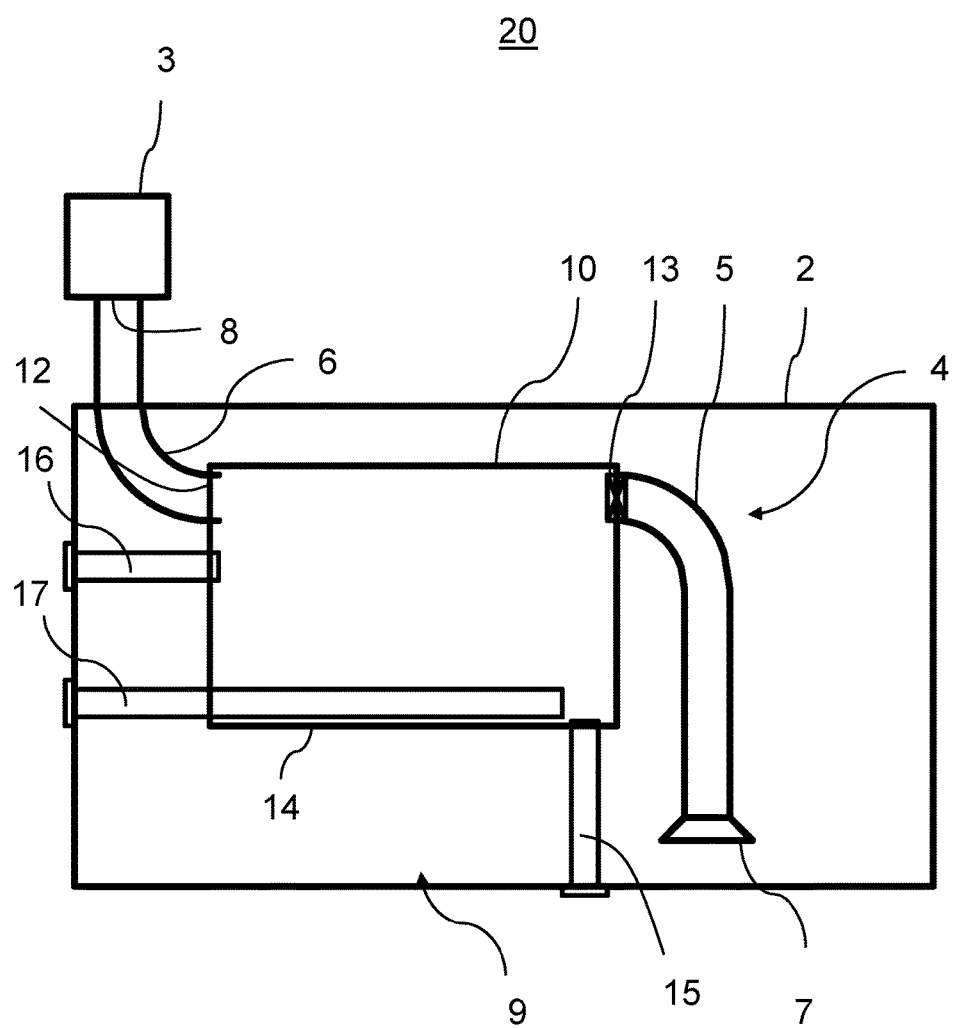
FIG. 2 shows a highly schematized illustration of a device for delivering lubricant in accordance with another aspect of the present disclosure.

FIG. 2 illustrates another aspect of the present disclosure, likewise in a highly schematized diagrammatic illustration. In this case, identical or functionally equivalent elements are denoted by the same reference signs as in FIG. 1 and, in some cases, are not described separately.

Only the special features of the variant aspect shown in FIG. 2 will be explored below. One special feature is that a turbulator 13 is arranged in the region of the inlet opening 11 of the sedimentation container 10. The turbulator 13 is a component which acts as a turbulence generator as lubricant flows through it. This increases the rate at which particles settle by sedimentation in the bottom region of the sedimentation container.

The turbulator 13 can be embodied, for example, as a flow element which produces eddying of the flowing medium. The eddy current thereby produced imposes a transverse movement and/or transverse flow on the particles, which promotes the deposition of particles.

In terms of design, turbulators can be embodied in many different ways. They can be twisted plates within the pipe, guide vanes, baffles, orifice plates with special holes (e.g. obliquely arranged holes), and/or any geometry which can produce eddying.

The common feature of all the aspects is the production of eddying, a swirl lamp or a rotary motion around the axis of the main direction of flow. This is intended to ensure that particles are separated out of the main flow and directed towards the wall and deposited there.

In the bottom region, the sedimentation container 10 furthermore has a connection 15, which can be used as a drain to drain off settled suspension which is richer in relatively coarse particles than the overall suspension. This drain connection 15 can also used in combination with a filling connection 16 situated in an upper subsection of the sedimentation container 10 to flush the sedimentation container 10. In the lower subsection of the sedimentation container 10 there is furthermore an inspection connection 17. This connection can be used to remove samples of sedimented substance from the bottom region, for example, or also for cleaning purposes.

Although the present disclosure has been described with reference to particular illustrative aspects, it is obvious to a person skilled in the art that various modifications can be made and that equivalents used as substitutes without exceeding the scope of the present disclosure. Consequently, the present disclosure is not intended to be restricted to the illustrative aspects disclosed; on the contrary, it is intended to include all illustrative aspects which fall within the scope of the attached patent claims. In particular, the present disclosure also claims protection for the subject matter and the features of the dependent claims, irrespective of the claims to which they refer.

LIST OF REFERENCE SIGNS 1 device for delivering lubricant
2 lubricant collecting container, e.g. oil pan
3 lubricant pump, e.g. oil pump
4 lubricant intake pipe, e.g. enveloping intake pipe
5 first pipe segment
6 second pipe segment
7 intake cage
8 outlet of the lubricant intake pipe
9 lubricant collecting region
10 sedimentation container
11 inlet opening
12 outlet opening
13 turbulator
14 bottom region
15 drain connection
16 filling connection
17 inspection connection
20 device for delivering lubricant

What is claimed is:

1. A device for passing lubricant out of a lubricant collecting container of a machine or hydraulic system to a lubricant pump comprising:
   a lubricant intake pipe, and
   a sedimentation container, which is connected fluidically to the lubricant intake pipe, wherein the sedimentation container has a turbulator configured to increase a sedimentation rate of contaminants in the lubricant, the turbulator arranged in the region of an inlet opening of the sedimentation container.

2. The device according to claim 1, wherein the lubricant intake pipe:
   a) has a first pipe segment, by means of which lubricant can be fed from the lubricant collecting container to an inlet opening of the sedimentation container, and
   b) has a second pipe segment, by means of which lubricant emerging from an outlet opening of the sedimentation container can be delivered in the direction of the lubricant pump.

3. The device according to claim 1, wherein the sedimentation container has a drain connection arranged in the bottom region.

4. The device according to claim 1, wherein the sedimentation container has a filling connection or an inspection connection.

5. The device according to claim 1, wherein the sedimentation container forms a segment of the lubricant intake pipe which has an enlarged cross section.

6. The device according to claim 1, wherein the sedimentation container is embodied as a separate component, which is connected fluidically to the lubricant intake pipe.

7. The device according to claim 1, wherein the lubricant intake pipe has an intake cage at the inlet end thereof.

8. The device according to claim 1, further comprising the lubricant collecting container.

9. The device according to claim 8, wherein the sedimentation container is integrated into the lubricant collecting container or is encased by the latter; or
   the sedimentation container is arranged outside the lubricant collecting container.

10. The device according to claim 8, wherein the lubricant collecting container is an oil pan of an internal combustion engine.

11. The device according to claim 1, further comprising the lubricant pump, in particular of an oil circuit of an internal combustion engine.

12. The device according to claim 11, wherein the lubricant pump is designed to draw in lubricant from an oil pan via the lubricant intake pipe and the sedimentation container and to feed it to consuming units.

13. The device according to claim 1, the machine or hydraulic system is an internal combustion engine.

14. The device according to claim 1, wherein the device is a component of an oil circuit of an internal combustion engine.

15. A motor vehicle comprising:
   a device for passing lubricant out of a lubricant collecting container to a lubricant pump, the device including,
   a lubricant intake pipe, and
   a sedimentation container, which is connected fluidically to the lubricant intake pipe, wherein the sedimentation container has a turbulator configured to increase a sedimentation rate of contaminants in the lubricant, the turbulator arranged in the region of an inlet opening of the sedimentation container.

* * * * *